(12) United States Patent
Chuang

(10) Patent No.: US 9,091,378 B2
(45) Date of Patent: Jul. 28, 2015

(54) TUBE COUPLING DEVICE

(71) Applicant: Chin Tang Chuang, Changhua (TW)

(72) Inventor: Chin Tang Chuang, Changhua (TW)

( * ) Notice: Subject to any disclaimer, the term of this patent is extended or adjusted under 35 U.S.C. 154(b) by 243 days.

(21) Appl. No.: 13/928,705

(22) Filed: Jun. 27, 2013

(65) Prior Publication Data

US 2015/0000771 A1 Jan. 1, 2015

(30) Foreign Application Priority Data

Apr. 30, 2013 (TW) .............................. 102207943 U

(51) Int. Cl.
*E03C 1/10* (2006.01)
*F16L 29/00* (2006.01)
*F16K 15/02* (2006.01)
*F16L 19/00* (2006.01)

(52) U.S. Cl.
CPC ............... *F16L 29/00* (2013.01); *F16K 15/028* (2013.01); *F16L 19/00* (2013.01); *Y10T 137/7922* (2015.04)

(58) Field of Classification Search
CPC .......... F16K 15/02; F16L 29/00; F16L 19/00; Y10T 137/7922

USPC .................................. 137/215, 216, 217, 218
See application file for complete search history.

(56) References Cited

U.S. PATENT DOCUMENTS

| | | | |
|---|---|---|---|
| 4,620,330 A | 11/1986 | Izzi, Sr. | |
| 4,821,763 A * | 4/1989 | Ackroyd et al. | 137/218 |
| 8,245,721 B2 * | 8/2012 | Kuo | 137/217 |
| 2005/0178434 A1 * | 8/2005 | Yang | 137/218 |
| 2006/0196542 A1 * | 9/2006 | Yen | 137/218 |
| 2007/0240764 A1 * | 10/2007 | Huang | 137/217 |

* cited by examiner

*Primary Examiner* — Craig Schneider
*Assistant Examiner* — Kevin Barss
(74) *Attorney, Agent, or Firm* — Charles E. Baxley

(57) ABSTRACT

A tube coupling device includes a coupling member having a lower casing and an upper housing and a peripheral flange extended between the casing and the housing, a water guide plate is engaged into the housing and has one or more off-center passages, a partition member is engaged in the housing and includes a pathway for the water to flow from the water guide plate and into the casing, and the partition member includes an inclined inner peripheral surface formed around an upper recess for defining an inner peripheral projection and for engaging with the water guide plate and for anchoring and retaining the water guide plate in the housing, a receptacle is engaged in the casing for preventing the materials in the coupling member from being released into the water.

3 Claims, 5 Drawing Sheets

TUBE COUPLING DEVICE

BACKGROUND OF THE INVENTION

1. Field of the Invention

The present invention relates to a tube or plumbing or pipe coupling device or joint, and more particularly to a pipe or tube coupling device including an insulator or insulating mechanism for coupling two tubular members together and for making a water tight seal between the two tubular members and having a check valve device for controlling the water flowing through or between the tubular members.

2. Description of the Prior Art

Typical faucets or valve members or tube or conduit or pipe or plumbing coupling devices or joints comprise a pivotal valve member adapted to cooperate with a neck of a drain casing, and to constitute a closure for the neck of the drain casing.

For example, U.S. Pat. No. 4,620,330 to Izzi, Sr. discloses one of the examples of the typical conduit couplings or stop valves or plumbing coupling devices or joints for providing with a single coupling unit construction a variety of different functions including clean-out access, pipe end dust covers or vents, drain assemblies, threaded pipe to plastic couplings, flush floor or wall mount, snap-in friction fit or permanent solvent welded installation, etc.

However, the typical conduit coupling or plumbing coupling device or joint may not be used to selectively couple two tubular members together, and also may not be used to selectively control the water flowing between two tubular members that are coupled together.

U.S. Pat. No. 8,245,721 to Kuo discloses another typical conduit coupling or plumbing coupling device or joint for providing with a single coupling unit construction and including a pivotal valve member pivotally or rotatably coupled to a neck or mouth piece for constituting a closure for the neck or the mouth piece of the floor drains or the like.

However, the typical conduit coupling or plumbing coupling device or joint also may not be used to selectively couple two tubular members together, and also may not be used to selectively control the water flowing between two tubular members that are coupled together.

The present invention has arisen to mitigate and/or obviate the afore-described disadvantages of the conventional pipe or tube coupling devices.

SUMMARY OF THE INVENTION

The primary objective of the present invention is to provide a tube coupling device including an insulator or insulating mechanism for coupling two tubular members together and for making a water tight seal between the two tubular members and having a check valve device for controlling the water flowing through or between the tubular members.

In accordance with one aspect of the invention, there is provided a tube coupling device comprising a coupling member including a lower casing having an outer thread formed thereon for coupling to a tubular member, and including a chamber formed in the casing of the coupling member, and including a peripheral swelling extended radially and inwardly from the casing and into the chamber of the casing, and including a peripheral rib extended radially and inwardly from the peripheral swelling and into the chamber of the casing, and including a peripheral flange extended radially and outwardly from an upper portion of the casing, and including an upper peripheral housing extended from the peripheral flange of the casing, the housing including an inner compartment formed therein and including a peripheral bulge extended radially and inwardly into the compartment of the housing and located above the peripheral flange and spaced from the peripheral flange for forming an inner peripheral space between the peripheral flange and the peripheral bulge, and including a plurality of openings formed in the peripheral flange and communicating with the inner peripheral space of the housing and communicating with an environment of the casing and the housing for allowing an outside air to flow through the openings of the peripheral flange and into the peripheral space of the housing and then into the chamber of the casing, the housing including an inner thread formed therein, a lock nut engaged with the inner thread of the housing and attached to the housing for receiving a water, a water guide plate engaged into the compartment of the housing and engaged into the lock nut, and including at least one off-center passage formed therein for allowing the water to flow from the lock nut and through the off-center passage of the water guide plate and into the chamber of the casing, and including a depression formed in an upper portion of the water guide plate and communicating with the off-center passage of the water guide plate, and including an outer peripheral recess formed in the water guide plate for engaging with the peripheral bulge of the housing, the lock nut including an inner peripheral space formed therein for engaging with an outer peripheral portion of the water guide plate and for anchoring the water guide plate between the housing and the lock nut, a sealing ring engaged into the lock nut and engaged with the water guide plate for making a water tight seal between the water guide plate and the lock nut, a partition member including an outer peripheral flange engaged into the inner peripheral space of the housing and anchored between the peripheral flange and the peripheral bulge of the housing, and including a pathway formed therein for allowing the water to flow from the off-center passage of the water guide plate and into the chamber of the casing, and the partition member including an upper recess formed therein and communicating with the pathway of the partition member, and including an inclined inner peripheral surface formed therein and located around the recess of the partition member for defining an inner peripheral projection which is extended radially and inwardly into the recess of the partition member and which includes a recessed lower portion having a relatively greater inner diameter, and an inwardly protruded upper portion having a relatively smaller inner diameter for engaging with the water guide plate and for anchoring and retaining the water guide plate in the housing, a receptacle engaged into the chamber of the casing and including a radially and inwardly extended peripheral flange, and including a peripheral fence extended downwardly from the peripheral flange for forming an outer peripheral space and for engaging with the peripheral swelling of the casing, and including a peripheral flap extended radially and inwardly from the peripheral fence and a peripheral plate extended downwardly from the peripheral flap for forming an outer peripheral shoulder and for engaging with the peripheral rib of the casing and for anchoring and securing the receptacle in the chamber of the casing, the receptacle including a space formed therein, a spring biasing member and a valve member received and engaged in the space of the receptacle, and the spring biasing member being engaged with the valve member for biasing the valve member to selectively engage with the partition member and to selectively block the pathway of the partition member, and the water flowing from the lock nut and flowing through the off-center passage of the water guide plate being capable of forcing the valve member away from the partition member to allow the water to flow through the pathway of the partition member and to flow into the space of the receptacle, and the air being capable of selectively flowing through the openings of the peripheral flange and into the space of the receptacle.

The casing includes at least one inner peripheral depression formed therein, and the receptacle includes at least one outer peripheral protrusion extended radially and outwardly therefrom for selectively engaging with the inner peripheral depression of the casing and for anchoring and securing the receptacle in the chamber of the casing.

The water guide plate includes a lower space formed therein and communicating with the off-center passage thereof.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
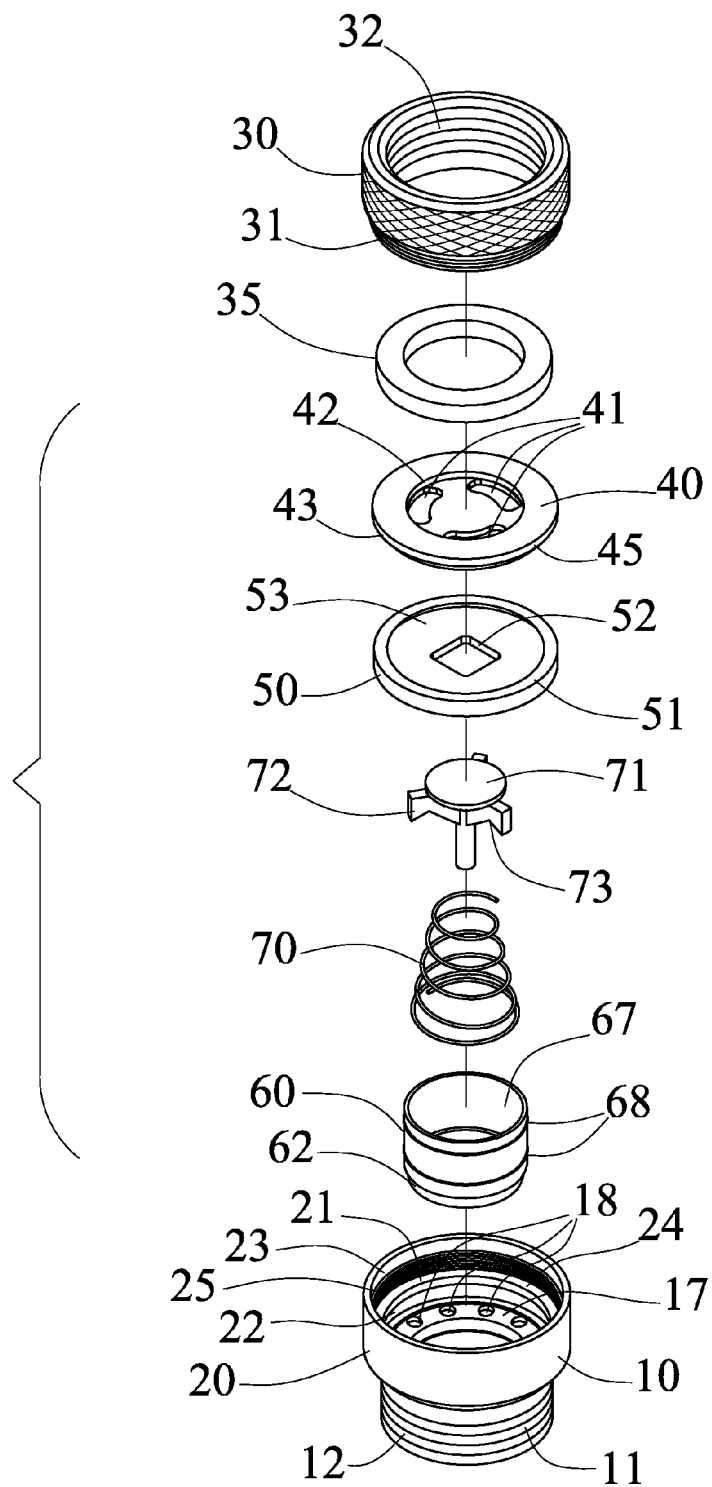
FIG. 1 is an exploded view of a tube coupling device in accordance with the present invention.
Figure 2:
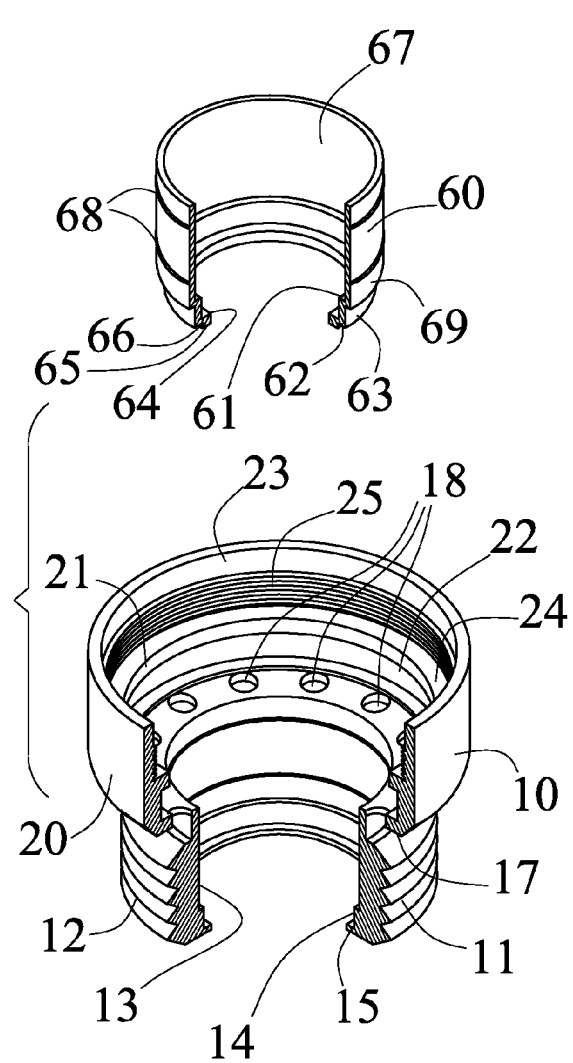
FIG. 2 is an enlarged partial exploded view illustrating a portion of the parts or elements of the tube coupling device, in which a portion or one quarter of the parts or elements of the tube coupling device has been cut off for showing the inner structure of the tube coupling device.
Figure 3:
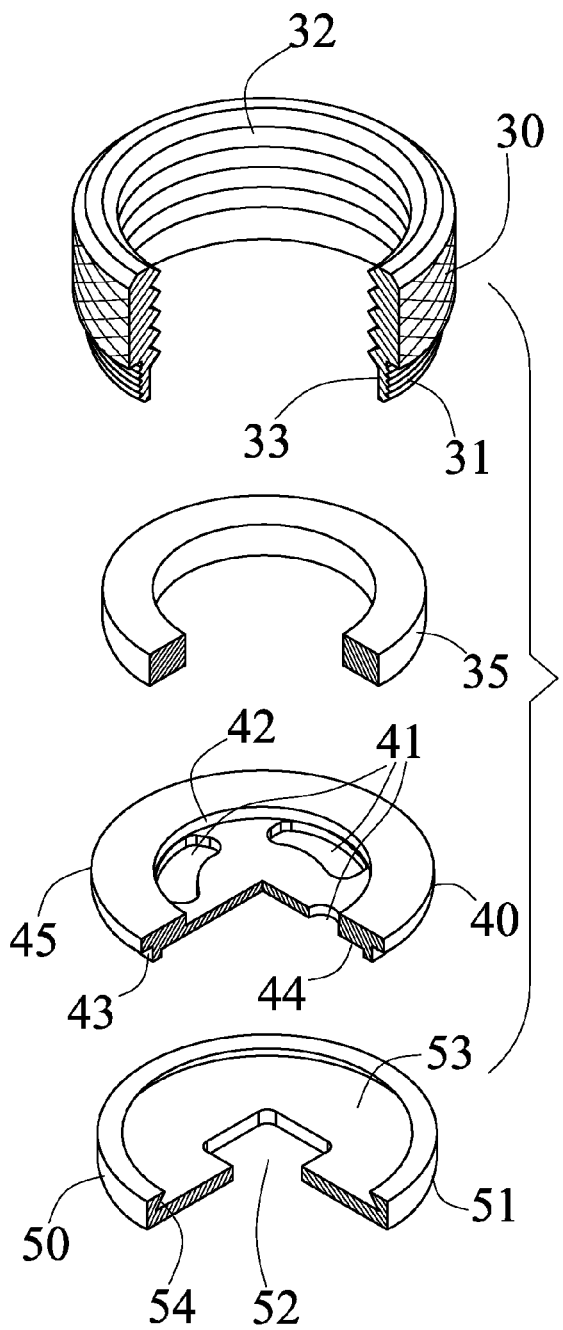
FIG. 3 is another partial exploded view illustrating the other portion of the parts or elements of the tube coupling device, in which a portion or one quarter of the parts or elements of the tube coupling device has been cut off for showing the inner structure of the tube coupling device.
Figure 6:
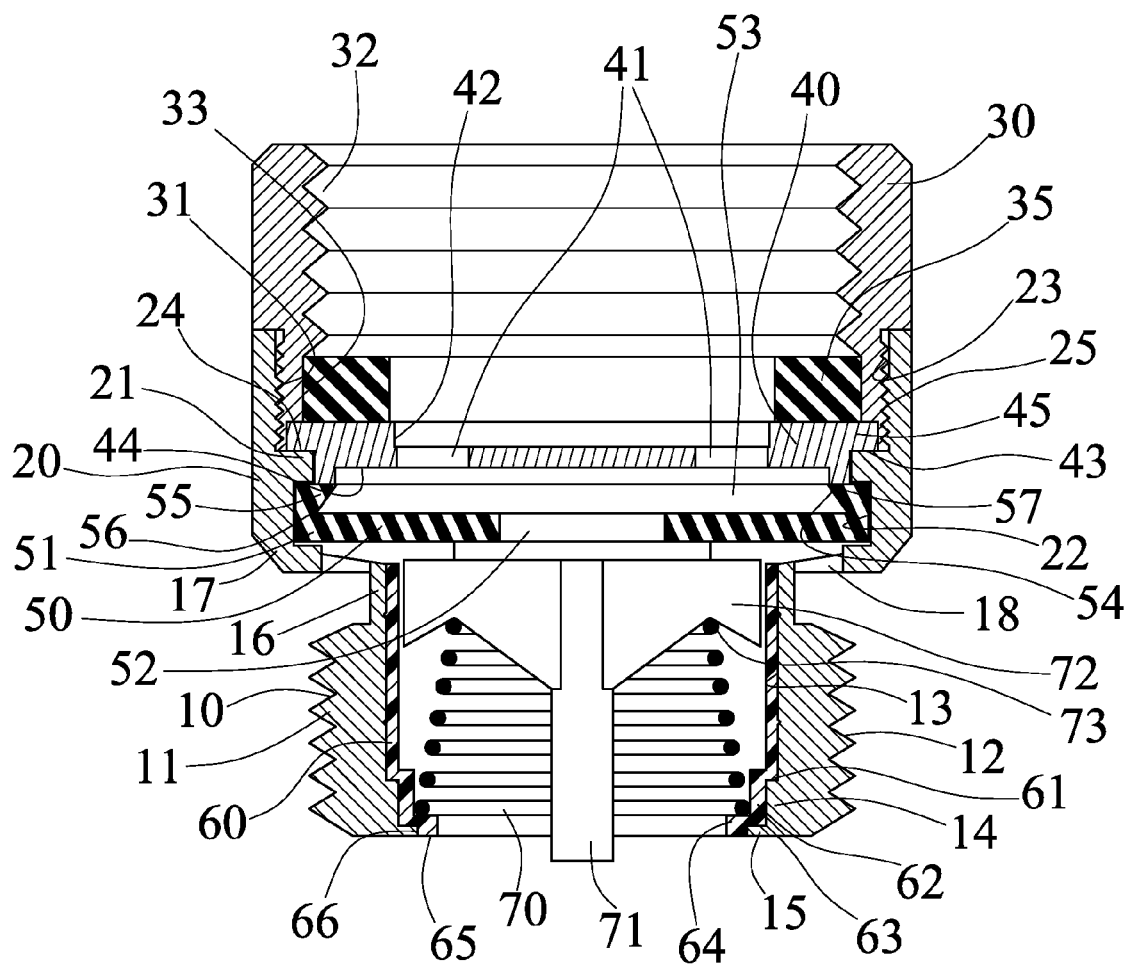
FIG. 6 is a cross sectional view of the tube coupling device, taken along lines 6-6 of FIG. 5.
Figure 7:
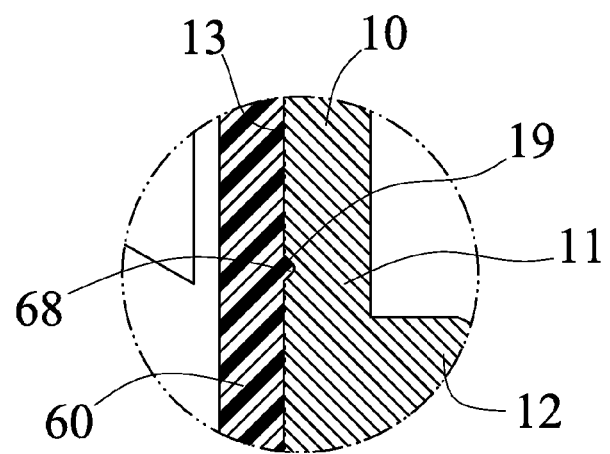
FIG. 7 is an enlarged partial cross sectional view of the tube coupling device.

Referring to the drawings, and initially to FIGS. 1-6, a tube coupling device in accordance with the present invention comprises a tubular or cylindrical coupling body or member 10 including a lower casing 11 having an outer thread 12 formed thereon for threading or engaging with a tubular member (not illustrated) and for detachably attaching or mounting or securing or coupling the coupling member 10 to the tubular member (not illustrated), and including a chamber 13 formed in the lower casing 11 of the coupling member 10 (FIGS. 2, 6), and including a peripheral bulge or swelling 14 extended radially and inwardly from the lower casing 11 of the coupling member 10 and into the chamber 13 of the coupling member 10, and further including a peripheral rib 15 extended radially and inwardly therefrom, such as extended from the lower portion of the peripheral swelling 14 and also into the chamber 13 of the coupling member 10 for forming a ladder type structure or configuration (FIGS. 2, 6).

The coupling member 10 further includes a peripheral flange 17 extended laterally or radially and outwardly from the upper portion 16 of the casing 11 of the coupling member 10 and substantially perpendicular to the coupling member 10, and includes an upper peripheral housing 20 formed or provided on or extended from the upper portion 16 of the coupling member 10, such as extended radially and upwardly from the peripheral flange 17 of the coupling member 10. The upper housing 20 includes a peripheral wall or swelling or bulge 21 extended radially and inwardly therefrom and located above the peripheral flange 17 and substantially parallel to the peripheral flange 17 and spaced upwardly from the peripheral flange 17 for forming an inner peripheral space 22 between the peripheral flange 17 and the peripheral bulge 21.

The coupling member 10 further includes a number of orifices or openings 18 formed in the peripheral flange 17 and preferably equally spaced from each other and communicating with the inner peripheral space 22 of the peripheral housing 20, and also communicating with the outside environment of the peripheral housing 20, best shown in FIG. 6, and offset from the chamber 13 of the casing 11 of the coupling member 10, or the openings 18 of the peripheral flange 17 of the coupling member 10 are not communicating with the chamber 13 of the casing 11 of the coupling member 10, and for allowing the air from the outside environment of the coupling member 10 to flow through the openings 18 of the coupling member 10 and into the peripheral space 22 of the peripheral housing 20 and then to flow into the chamber 13 of the casing 11 of the coupling member 10. The housing 20 includes an inner compartment 23 formed or defined therein, and includes an inner peripheral shoulder 24 formed or defined therein and communicating with the compartment 23 of the housing 20, and includes an inner thread 25 formed or defined therein.

Figure 4:
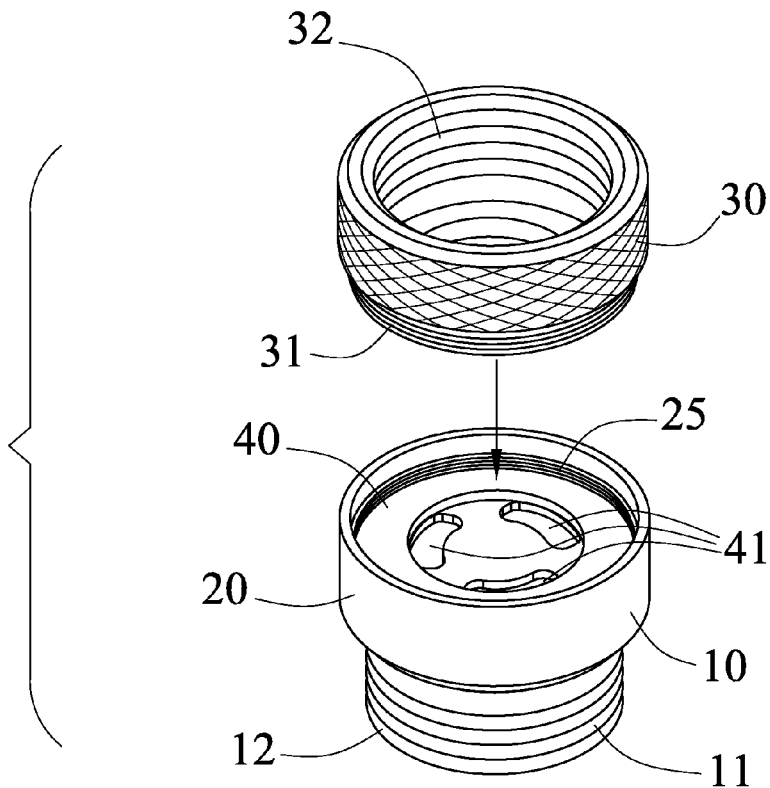
FIG. 4 is a further partial exploded view illustrating the operation of the tube coupling device.
Figure 5:
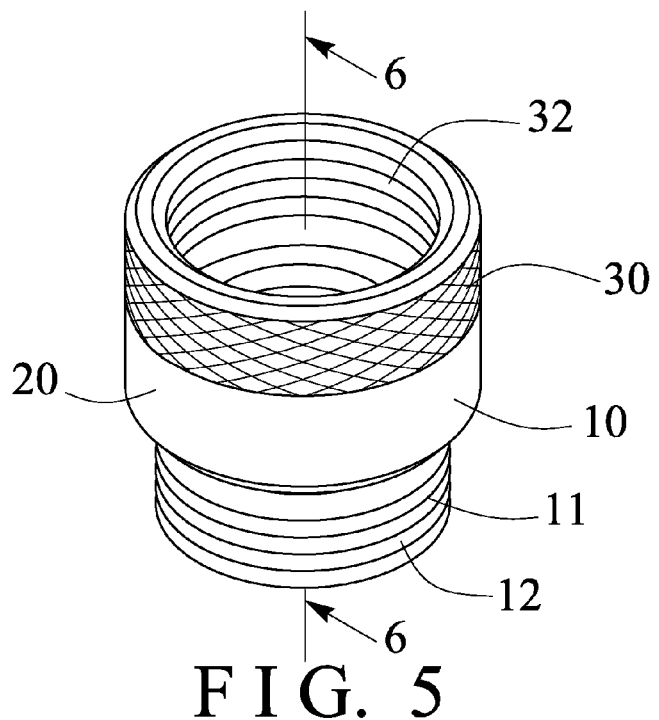
FIG. 5 is a perspective view of the tube coupling device.

For example, as shown in FIGS. 4 and 6, the inner thread 25 of the housing 20 of the coupling member 10 may be provided for attaching or threading or engaging with an outer thread 31 of a lock nut 30 which includes an inner thread 32 for threading or engaging with another tubular member (not shown), or for attaching or mounting or securing or coupling to a water reservoir (not shown), such as the water faucet for receiving the water from the water reservoir or faucet, and for allowing the water to flow from the water reservoir or the water faucet toward and through the lock nut 30 and then toward and through the compartment 23 of the housing 20 and the chamber 13 of the casing 11 of the coupling member 10, and then for allowing the water to flow out through the tubular member that is attached or mounted or secured or coupled to the casing 11 of the coupling member 10.

A washer or water guide plate 40 is engaged into the compartment 23 of the housing 20, and also engaged into the lock nut 30, and contacted or engaged with the inner peripheral shoulder 24 of the housing 20 for stably anchoring or positioning or mounting the water guide plate 40 to the housing 20 of the coupling member 10, and the water guide plate 40 includes one or more (such as three) off-center apertures or passages 41 formed therein and equally spaced from each other for allowing the water to flow from the lock nut 30 or the water reservoir or faucet toward and through the passages 41 of the water guide plate 40 and then into the chamber 13 of the coupling member 10 and/or into the tubular member. The water guide plate 40 includes a depression 42 formed therein, such as formed in the upper portion thereof and communicating with the passages 41 thereof, and includes an outer peripheral recess 43 formed therein for snugly fitting or engaging with the peripheral bulge 21 of the housing 20.

It is preferable, but not necessary that the water guide plate 40 includes another depression or space 44 formed therein, such as formed in the lower portion thereof and also communicating with the passages 41 thereof. The lock nut 30 includes an inner peripheral space 33 formed therein for snugly fitting or engaging with the outer peripheral portion 45 of the water guide plate 40 for allowing the water guide plate 40 to be snugly fitted or engaged and anchored or retained or secured or positioned between the housing 20 and the lock nut 30. A gasket or sealing ring 35 is engaged into the lock nut 30 and contacted and engaged with the water guide plate 40 for making a suitable water tight seal between or among the water guide plate 40 and the lock nut 30 and/or the water reservoir or the water faucet.

A flexible or resilient or spring valve member or washer or gasket or flexible partition member 50 is engaged into the housing 20 of the coupling member 10, such as engaged into the inner peripheral space 22 of the peripheral housing 20, and includes an outer peripheral portion or flange 51 snugly fitted or engaged in the inner peripheral space 22 of the peripheral housing 20 and anchored or retained or secured or positioned between the peripheral bulge 21 of the housing 20 and the peripheral flange 17 of the coupling member 10, and includes a center bore or opening or passage or pathway 52 formed therein for allowing the water to flow from the housing 20 to the coupling member 10, and includes a depression or space or recess 53 formed in the upper portion thereof and communicating with the pathway 52 thereof for allowing the water to flow from the passages 41 of the water guide plate 40 and through the pathway 52 of the flexible partition member 50 and then into the chamber 13 of the coupling member 10 and/or into the tubular member and thus for guiding or controlling the water flowing between the lock nut 30 and the tubular member, best shown in FIG. 6.

Figure 8:
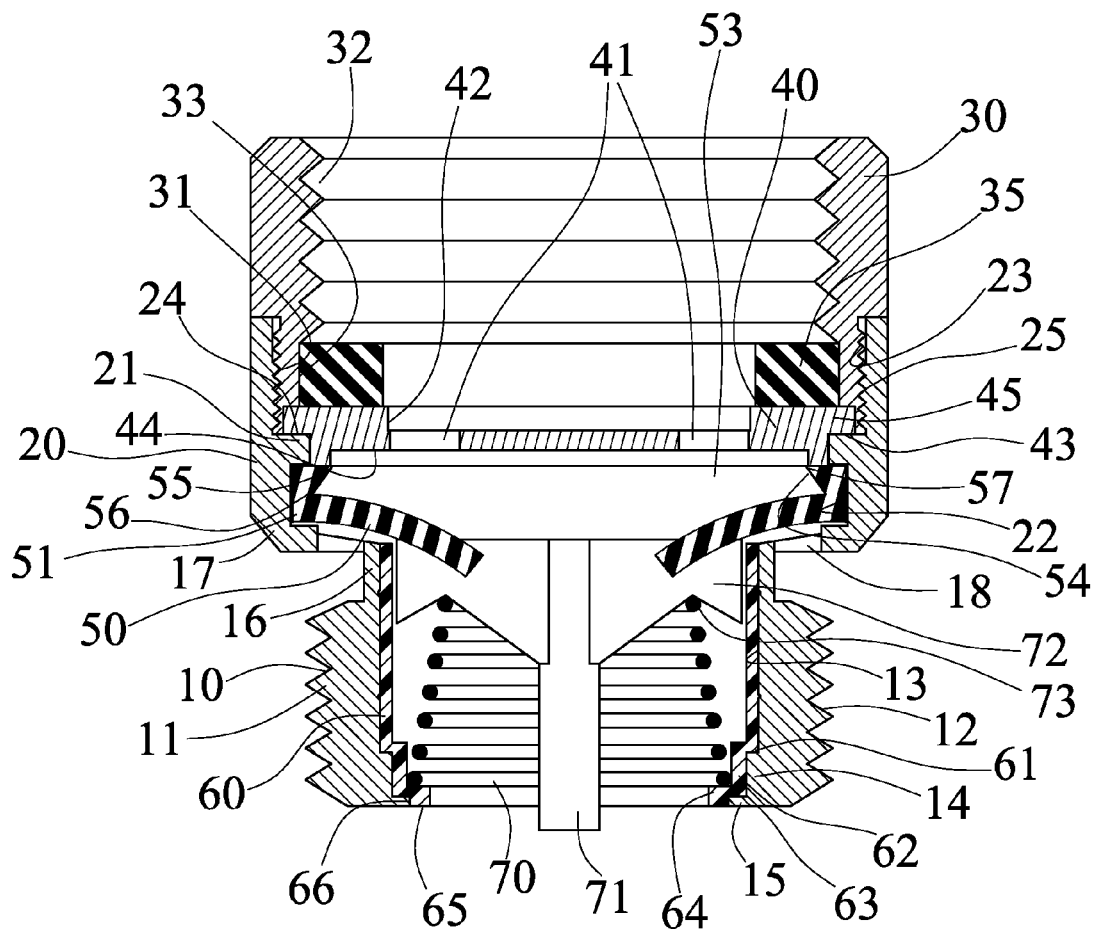
FIG. 8 is a cross sectional view similar to FIG. 6, illustrating the operation of the tube coupling device.

It is to be noted that the formation or the provision of the recess 53 in the upper portion of the partition member 50 may suitably increase the flexibility or the resilience of the partition member 50 for allowing the partition member 50 to be suitably depressed or deformed by the water or water pressure in the lock nut 30 and/or in the peripheral housing 20, and to be forced to contact and engage with the upper portion 16 or the peripheral flange 17 of the coupling member 10 (FIG. 8) in order to selectively block or seal the openings 18 of the peripheral flange 17 of the coupling member 10 and so as to prevent the water from flowing out through the openings 18 of the peripheral flange 17 of the coupling member 10 when the openings 18 of the peripheral flange 17 of the coupling member 10 are selectively blocked or sealed by the flexible partition member 50.

The partition member 50 further includes an inclined or tilted inner peripheral surface 54 formed therein and formed or located around the recess 53 in the upper portion of the partition member 50 for forming or defining an inner peripheral tip or projection 55 which is extended radially and inwardly into the recess 53 of the partition member 50 and which includes a recessed lower portion 56 having a relatively greater inner diameter, and an inwardly projected or protruded upper portion 57 having a relatively smaller inner diameter, in which the inwardly projected or protruded upper portion 57 that includes a relatively smaller inner diameter may be provided for contacting and engaging with the lower or bottom portion of the water guide plate 40 and for stably or solidly anchoring or positioning or mounting or retaining the water guide plate 40 in the housing 20 of the coupling member 10.

A receptacle 60 is engaged into the chamber 13 of the coupling member 10 and includes a peripheral flange 61 extended laterally or radially and inwardly from the lower portion 69 of the receptacle 60 and substantially perpendicular to the receptacle 60, and includes a peripheral fence 62 extended downwardly from the peripheral flange 61 and substantially parallel to the receptacle 60 for forming or defining an outer peripheral shoulder or space 63 and for receiving or engaging with the peripheral swelling 14 of the coupling member 10 and for anchoring or positioning or mounting or securing the receptacle 60 in the chamber 13 of the coupling member 10 and for preventing the receptacle 60 from being moved relative to the coupling member 10, and also for preventing the receptacle 60 from being disengaged from the coupling member 10.

The receptacle 60 further includes another peripheral flange or rib or flap 64 extended laterally or radially and inwardly from the lower portion of the peripheral fence 62 and substantially perpendicular to the peripheral fence 62, and includes another peripheral fence or wall or plate 65 extended downwardly from the peripheral flap 64 and substantially parallel to the peripheral fence 62 for forming or defining another outer peripheral space or shoulder 66 and for receiving or engaging with the peripheral rib 15 of the coupling member 10 and for further anchoring or positioning or mounting or securing the receptacle 60 in the chamber 13 of the coupling member 10 and for further preventing the receptacle 60 from being moved relative to the coupling member 10, and also for further preventing the receptacle 60 from being disengaged from the coupling member 10.

The receptacle 60 includes a space 67 formed therein for receiving a spring biasing member 70 and a valve member 71, in which the valve member 71 includes one or more radially extended flaps or fins 72 each having a recess 73 formed in the lower portion thereof for receiving or engaging with the spring biasing member 70 and for stably or solidly anchoring or positioning or mounting or retaining the spring biasing member 70 in the space 67 of the receptacle 60 and for allowing the spring biasing member 70 to stably engage with and to bias or force or move the valve member 71 toward and to engage with the partition member 50 (FIGS. 6, 8) and so as to selectively block the pathway 52 of the partition member 50, and in order to selectively prevent the water from flowing out through the pathway 52 of the partition member 50.

The spring biasing member 70 is contacted and engaged with the peripheral fence 62 and/or the peripheral flap 64 of the receptacle 60 for being stably or solidly anchored or positioned or mounted or retained in the receptacle 60. As shown in FIGS. 1-2 and 6-8, the receptacle 60 may further include one or more (such as two) outer peripheral tips or projections or keys or protrusions 68 extended radially and outwardly therefrom for selectively engaging with the corresponding inner peripheral cavities or spaces or recesses or depressions 19 that are formed in the inner peripheral portion of the casing 11 of the coupling member 10 (FIG. 7) and for further anchoring or positioning or mounting or securing the receptacle 60 in the chamber 13 of the coupling member 10 and for further preventing the receptacle 60 from being moved relative to the coupling member 10, and also for further preventing the receptacle 60 from being disengaged from the coupling member 10.

In operation, as shown in FIG. 6, when no water is supplied or flows into the lock nut 30, the spring biasing member 70 may bias the valve member 71 to engage with the partition member 50 in order to selectively block the pathway 52 of the partition member 50 and to prevent the water from flowing through the pathway 52 of the flexible partition member 50 and to prevent the water from flowing into the chamber 13 of the coupling member 10. At this moment, the air from the outside environment of the housing 20 and the coupling member 10 may flow through the openings 18 of the housing 20 and may then flow into the space formed between the partition member 50 and the peripheral flange 17 of the casing 11 of the coupling member 10, and may then flow into the space 67 of the receptacle 60.

It is to be noted that the partition member 50 is resiliently engaged with and blocked by the valve member 71. Accordingly, when in the winter or snowy days, and when the water in the lock nut 30 and/or the tubular member or the water faucet or the water reservoir is iced and expanded, the partition member 50 may be forced or compressed or depressed or deformed by the expanded and iced water to engage with and to compress or depress the valve member 71, such that the lock nut 30 and/or the tubular member or the water faucet or the water reservoir may be prevented from being broken or damaged by the expanded and iced water. In addition, the chamber 13 of the coupling member 10 is covered by the receptacle 60, and the coupling member 10 may be prevented from being contacted by the water flowing into the space 67 of the receptacle 60, such that the materials in the coupling member 10 may be prevented from being released into the water.

Accordingly, the tube coupling device in accordance with the present invention includes an insulator or insulating mechanism for coupling two tubular members together and for making a water tight seal between the two tubular members and having a check valve device for controlling the water flowing through or between the tubular members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tube coupling device comprising:
   a coupling member including a lower casing having an outer thread formed thereon for coupling to a tubular member, and including a chamber formed in said casing of said coupling member, and including a peripheral swelling extended radially and inwardly from the casing and into the chamber of the casing, and including a peripheral rib extended radially and inwardly from the peripheral swelling and into the chamber of the casing, and including a peripheral flange extended radially and outwardly from an upper portion of the casing, and including an upper peripheral housing extended from the peripheral flange of the casing, the housing including an inner compartment formed therein and including a peripheral bulge extended radially and inwardly into the compartment of the housing and located above the peripheral flange and spaced from the peripheral flange for forming an inner peripheral space between the peripheral flange and the peripheral bulge, and including a plurality of openings formed in said peripheral flange and communicating with said inner peripheral space of said housing and communicating with an environment of said casing and said housing for allowing an outside air to flow through the openings of the peripheral flange and into the peripheral space of the housing and then into the chamber of the casing, the housing including an inner thread formed therein,
   a lock nut engaged with said inner thread of the housing and attached to said housing for receiving a water,
   a water guide plate engaged into said compartment of the housing and engaged into the lock nut, and including at least one off-center passage formed therein for allowing the water to flow from the lock nut and through the at least one off-center passage of the water guide plate and into the chamber of the casing, and including a depression formed in an upper portion of the water guide plate and communicating with the at least one off-center passage of the water guide plate, and including an outer peripheral recess formed in the water guide plate for engaging with the peripheral bulge of the housing, the lock nut including an inner peripheral space formed therein for engaging with an outer peripheral portion of the water guide plate and for anchoring the water guide plate between the housing and the lock nut,
   a sealing ring engaged into the lock nut and engaged with the water guide plate for making a water tight seal between the water guide plate and the lock nut,
   a partition member including an outer peripheral flange engaged into said inner peripheral space of said housing and anchored between said peripheral flange and said peripheral bulge of said housing, and including a pathway formed therein for allowing the water to flow from said at least one off-center passage of said water guide plate and into said chamber of said casing, and the partition member including an upper recess formed therein and communicating with the pathway of the partition member, and including an inclined inner peripheral surface formed therein and located around the recess of the partition member for defining an inner peripheral projection which is extended radially and inwardly into the recess of the partition member and which includes a recessed lower portion having a relatively greater inner diameter, and an inwardly protruded upper portion having a relatively smaller inner diameter for engaging with the water guide plate and for anchoring and retaining the water guide plate in the housing,
   a receptacle engaged into said chamber of said casing and including a radially and inwardly extended peripheral flange, and including a peripheral fence extended downwardly from the peripheral flange for forming an outer peripheral space and for engaging with the peripheral swelling of the casing, and including a peripheral flap extended radially and inwardly from the peripheral fence and a peripheral plate extended downwardly from the peripheral flap for forming an outer peripheral shoulder and for engaging with the peripheral rib of the casing and for anchoring and securing the receptacle in the chamber of the casing, the receptacle including a space formed therein,
   a spring biasing member and a valve member received and engaged in the space of the receptacle, and the spring biasing member being engaged with said valve member for biasing said valve member to selectively engage with said partition member and to selectively block said pathway of said partition member, and the water flowing from said lock nut and flowing through said at least one off-center passage of said water guide plate being capable of forcing said valve member away from said partition member to allow the water to flow through said pathway of said partition member and to flow into said space of said receptacle, and the air being capable of selectively flowing through said openings of said peripheral flange and into said space of said receptacle.

2. The tube coupling device as claimed in claim 1, wherein the casing includes at least one inner peripheral depression formed therein, and said receptacle includes at least one outer peripheral protrusion extended radially and outwardly therefrom for selectively engaging with the at least one inner peripheral depression of the casing and for anchoring and securing the receptacle in the chamber of the casing.

3. The tube coupling device as claimed in claim 1, wherein said water guide plate includes a lower space formed therein and communicating with the at least one off-center passage thereof.

* * * * *